ers...................29/25.42 X

United States Patent
Asher et al.

[15] 3,699,620
[45] Oct. 24, 1972

[54] METHOD FOR OBTAINING THE DIELECTRIC CONSTANT OF FRIT CAPACITORS

[72] Inventors: John W. Asher, Elmira; Andrew Herczog, Painted Post, both of N.Y.

[73] Assignee: Corning Glass Works, Corning, N.Y.

[22] Filed: May 16, 1968

[21] Appl. No.: 729,800

[52] U.S. Cl. ................................................29/25.42
[51] Int. Cl. ..............................................H01g 13/00
[58] Field of Search.............29/25.42, 576, 577, 589

[56] References Cited

UNITED STATES PATENTS

| | | |
|---|---|---|
| 3,465,426 | 9/1969 | Baier et al. ...................29/570 |
| 3,465,402 | 9/1969 | Booe et al..................29/25.42 |
| 3,457,615 | 7/1969 | Ikida et al.................29/25.42 |
| 3,419,759 | 12/1968 | Hayakawa....................29/576 |
| 3,419,758 | 12/1968 | Hayakawa et al. ..........29/576 |
| 3,411,947 | 11/1968 | Block et al............338/308 X |
| 3,394,290 | 7/1968 | Boykin..................29/25.42 X |
| 3,360,852 | 1/1968 | Cochran ..................29/412 X |
| 3,293,077 | 12/1966 | Kaiser et al..........29/25.42 X |
| 3,273,033 | 9/1966 | Rossemeis ............29/25.42 X |
| 3,179,545 | 4/1965 | Bowers.................29/25.42 X |

*Primary Examiner*—John F. Campbell
*Assistant Examiner*—Richard Bernard Lazarus
*Attorney*—Clarence R. Patty, Jr. and Walter S. Zebrowski

[57] ABSTRACT

A frit capacitor of either the discrete or integrated microcircuit variety having a ferroelectric glass-ceramic dielectric whose dielectric constant is of intermediate value between about 20 and 400. The desired value of dielectric constant is accurately obtained in a readily reproducible manner by mixing a batch containing appropriate quantities of stable non-crystallizable glass particles and glass particles capable of forming a ferroelectric crystal phase. The desired dielectric constant is obtained by subjecting the batch to heat treatment. By controlling the weight ratio of the two glass components during the batch preparation, individual capacitor dielectrics having different dielectric constants can be provided utilizing the same firing schedule for each.

3 Claims, 3 Drawing Figures

INVENTORS.
John W. Asher
Andrew Herczog

BY

*Walter S. Zebrowski*

ATTORNEY

METHOD FOR OBTAINING THE DIELECTRIC CONSTANT OF FRIT CAPACITORS

BACKGROUND OF THE INVENTION

One problem that has frequently been encountered in the manufacture of frit capacitors has been the difficulty in obtaining ferroelectric glass-ceramic dielectric materials, whose dielectric constants are of intermediate value (about 20 to 400), in an accurate and commercially reproducible manner. One usual method for obtaining glass-ceramic dielectric materials involves depositing a batch material, consisting of glass particles capable of forming a ferroelectric crystal phase mixed with a suitable vehicle, on a capacitor plate. The material is deposited so as to give it the desired shape and thickness. Thereafter, the unit so formed is fired in an oven at carefully controlled temperature levels and heating rates for specified time durations in order to produce a given amount of ferroelectric crystallization of the glass particles and thereby provide a glass-ceramic dielectric material which, upon completion of heat treatment, has the desired value of dielectric constant. Ferroelectric crystallization is initiated when the glass is heated to a temperature near its softening point and continues until either complete or partial crystallization occurs as determined by the temperature-time relationship of the heat treatment. Heretofore it has been the practice in the art to obtain the desired value of dielectric constant in glass dielectric materials by controlling the process of ferroelectric crystallization.

However, a finite amount of time is required to dissipate or remove heat from a glass dielectric material once it has been heated sufficiently to initiate ferroelectric crystallization. This is a particular disadvantage where a rapid rate of heating is employed to obtain the desired densification properties of the dielectric material. However, notwithstanding such a disadvantage, heat cannot be instantaneously removed from the material so as to terminate crystallization at precisely the desired value of dielectric constant. A dielectric constant of about 400 is ordinarily about the lowest value accurately obtainable in ferroelectric glass-ceramic materials. However, dielectric constants above this value can be obtained fairly accurately by controlling the heating schedule because, above this value, it is possible to control ferroelectric crystallization. For numerous examples of glass compositions which form a ferroelectric crystal phase with heat treatment and have the above-mentioned characteristics, reference is made to U.S. Pat. No. 3,195,030 entitled GLASS AND METHODS OF DEVITRIFYING SAME AND MAKING A CAPACITOR THEREFROM, by Andrew Herczog and Stanley D. Stookey.

On the other hand there are numerous stable glass compositions, that is, glasses which do not form a ferroelectric crystal phase with heat treatment, which are suitable as capacitor dielectric materials where low values of dielectric constant, generally less than about 20, are desired. Such glasses should be sufficiently alkali-free to avoid appreciable amounts of ion migration when subjected to electric fields of the size encountered in capacitor dielectric applications. Table I below lists, by way of example, the approximate compositions of two stable glasses suitable for use as capacitor dielectrics where low values of dielectric constant are required.

TABLE I

|  | 1 | 2 |
|---|---|---|
| $SiO_2$ | 58% | 50% |
| $Al_2O_3$ | 15% | 10% |
| CaO | 10% |  |
| MgO | 7% |  |
| BaO | 6% | 25% |
| $B_2O_3$ | 4% | 15% |

Thus, between the dielectric constant values of the ferroelectric glass-ceramic dielectrics and the stable glass dielectrics there exists an intermediate range of dielectric constants, between about 20 and about 400, which have been difficult to obtain in an accurate, reliable, and reproducible manner. Further, it has been virtually impossible to reproduce frit capacitors with ferroelectric glass-ceramic dielectrics having such intermediate dielectric constants within the narrow tolerance limits ordinarily required in commercial manufacturing processes. For this reason the manufacture of frit capacitors has been restricted either to dielectric constants of low value, below 20, or to high values of dielectric constant, above about 400.

Another problem that has been encountered in the manufacture of frit capacitors has been the inability to obtain individual capacitors whose dielectric constants, and consequently, their capacitance per unit area, can be selected as desired using a single heating schedule. This is a significant problem with respect to capacitors used in microcircuits where often it is desired to form numerous individual capacitors on a single microcircuit substrate. Since, heretofore, manipulation of the heating schedule has been the sole means of obtaining the desired dielectric constant and since all the capacitor units on a given substrate are necessarily subject to the same heat treatment, only a single value of capacitance per unit area has been obtainable for each capacitor on a single microcircuit substrate. Accordingly, in order to obtain different capacitance values between individual units on the same substrate, it has been necessary to provide individual differences in their areas.

SUMMARY OF THE INVENTION

It is, therefore, an object of the instant invention to provide a frit capacitor whose dielectric constant is within an intermediate range of values, from about 20 to about 400, in an accurate and uniformly reproducible manner.

It is a further object of the instant invention to provide a method for controlling the dielectric constants of frit capacitors during their fabrication.

It is yet another object of the instant invention to provide a method for making frit capacitors whose dielectric constants and capacitances per unit area are individually obtained, as desired, using a single heat treatment schedule.

It is still another object of the instant invention to provide a method of making frit capacitors whose dielectric constants are accurately obtainable over a wider range than heretofore possible.

Briefly, in accordance with the instant invention, particles of a substantially non-alkaline, stable glass, characterized by a low dielectric constant and a readily crystallizable glass which forms a ferroelectric phase, are mixed. The glass particles so mixed are mixed with a vehicle so as to form a fluid batch. The batch is formed into the desired shape and heat treated in order to volatilize the vehicle, consolidate the glass particles, and at least partially crystallize the ferroelectric glass.

Additional objects, features and advantages of the instant invention will become apparent to those skilled in the art from the following, more detailed description and attached drawings on which, by way of example, only the preferred embodiment of the instant invention is illustrated.

DESCRIPTION OF THE PREFERRED EMBODIMENT

A frit capacitor dielectric material is prepared by first providing a glass composition having the capability of forming ferroelectric crystals with heat treatment. In the instant example a suitable glass composition is tabulated in Table II below. For numerous other examples of glass compositions capable of forming ferroelectric crystals with heat treatment and suitable for purposes of the instant invention reference is again made to U.S. Pat. No. 3,195,030. The glass composition given in Table II, hereinafter referred to as the ferroelectric glass, is provided in particulate form with a grain size suitable for mixing with other materials in batch form. In the instant example a grain size of about 10 microns is used.

TABLE II

| | |
|---|---|
| BaO | 12.8% |
| SrO | 8.7% |
| PbO | 17.8% |
| $Nb_2O_5$ | 48.4% |
| $SiO_2$ | 7.6% |
| $Al_2O_3$ | 1.9% |
| $B_2O_3$ | 2.5% |
| $Cu_2O$ | 0.3% |

The ferroelectric glass particles are mixed with similarly sized particles of a substantially alkali-free stable glass (a glass which does not form a ferroelectric crystal phase), the composition of which is given in column 2 of Table I. Another stable glass composition suitable for purposes of the instant invention is given by way of example in column 1 of Table I.

Figure 1:
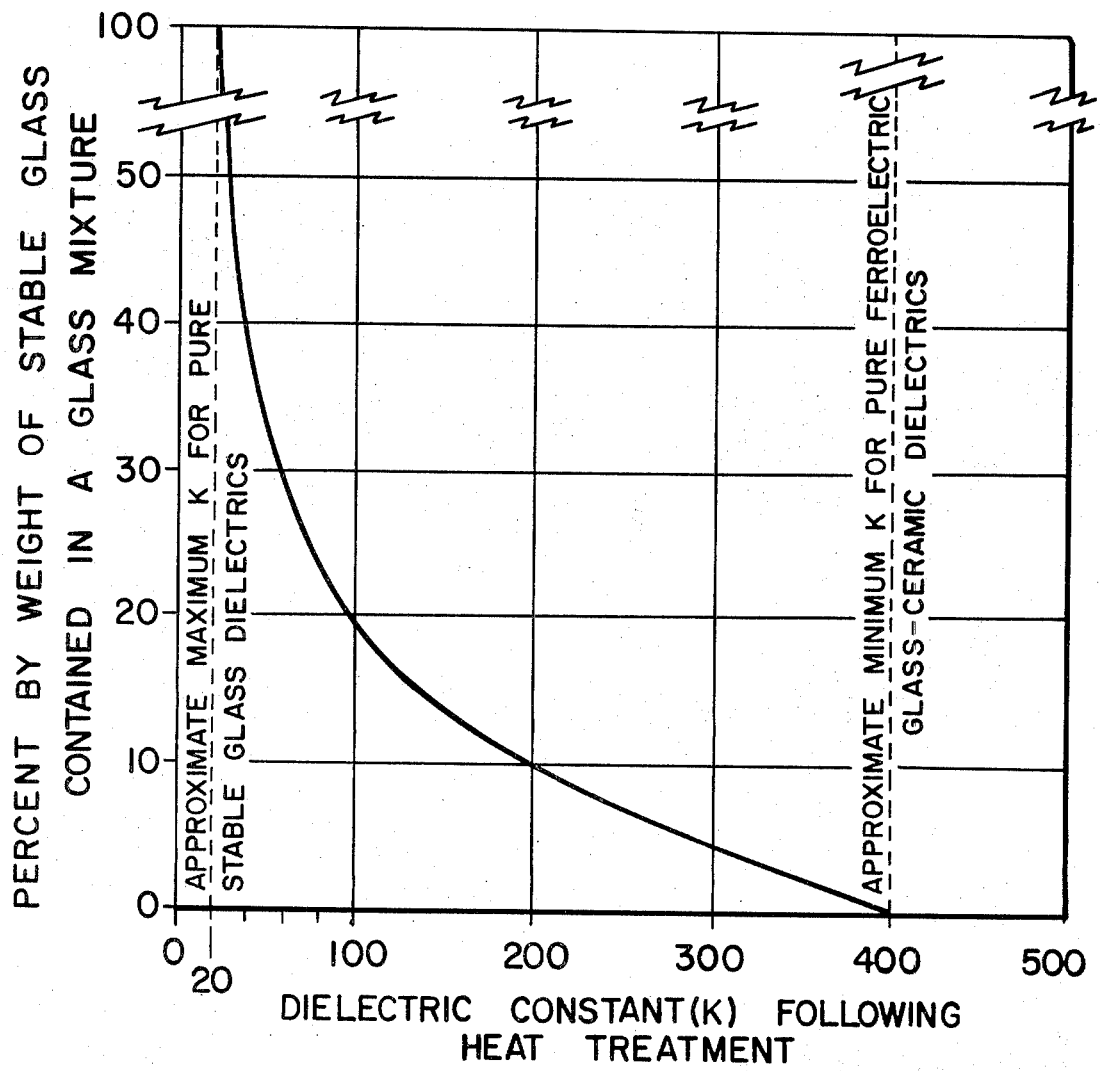
FIG. 1 graphically illustrates the relationship between the dielectric constant of the frit capacitor of the instant invention and the ratio, expressed in percent, of the weight of a stable, non-alkali glass to the weight of a glass mixture containing both the stable glass and a ferroelectric glass.

Referring to FIG. 1 the ferroelectric and stable glass particles are mixed together in a weight ratio corresponding to the desired value of dielectric constant sought upon completion of heat treatment as later explained. It should be noted that the graph gives intermediate range dielectric constant values for various weight ratios of the glass composition of the instant example following its exposure to a temperature of 940° C for a period of 5 minutes. For example, where a dielectric constant of 200 is desired, one part by weight of the stable glass is mixed with nine parts by weight of the ferroelectric glass, thereby providing a stable to total glass weight ratio of 10 percent.

The glass mixture so prepared is mixed with any suitable vehicle, well known in the art, such as pine oil, oil of lavender, or the like in order to prepare a fluid batch composition for deposition on a capacitor plate. The batch is thereafter deposited on a first capacitor plate by any well known method such as spraying, silk screening, sedimentation, or the like so as to form the desired shape of the dielectric to be obtained following heat treatment.

The unit so formed is fired in an oven at the above-mentioned heating schedule in order to volatilize the vehicle, promote consolidation of the glass components of the batch, and produce the amount of ferroelectric crystallization necessary to yield a dielectric material with a dielectric constant of 200.

Following the heat treatment, a second capacitor plate is formed on the opposite side of the dielectric from the first capacitor plate in any manner well known in the art. Suitable terminal wires are attached to each capacitor plate in a similarly well known manner thereby providing a frit capacitor having a glass-ceramic dielectric of intermediate dielectric constant.

It is to be noted that should other heating schedules of different temperatures, heating rates, and time durations be employed, a graph should be prepared similar to the graph of FIG. 1 for these conditions. As will readily be appreciated by those skilled in the art, this may be accomplished by subjecting various weight ratios of the desired mixture of stable and ferroelectric glasses to the particular heating schedule desired and tabulating a list of the resulting dielectric constants for each ratio following the heat treatment. Enough different mixture ratios should be heat treated as described above to enable one to plot a smooth curve of the type shown in FIG. 1.

Figure 3:
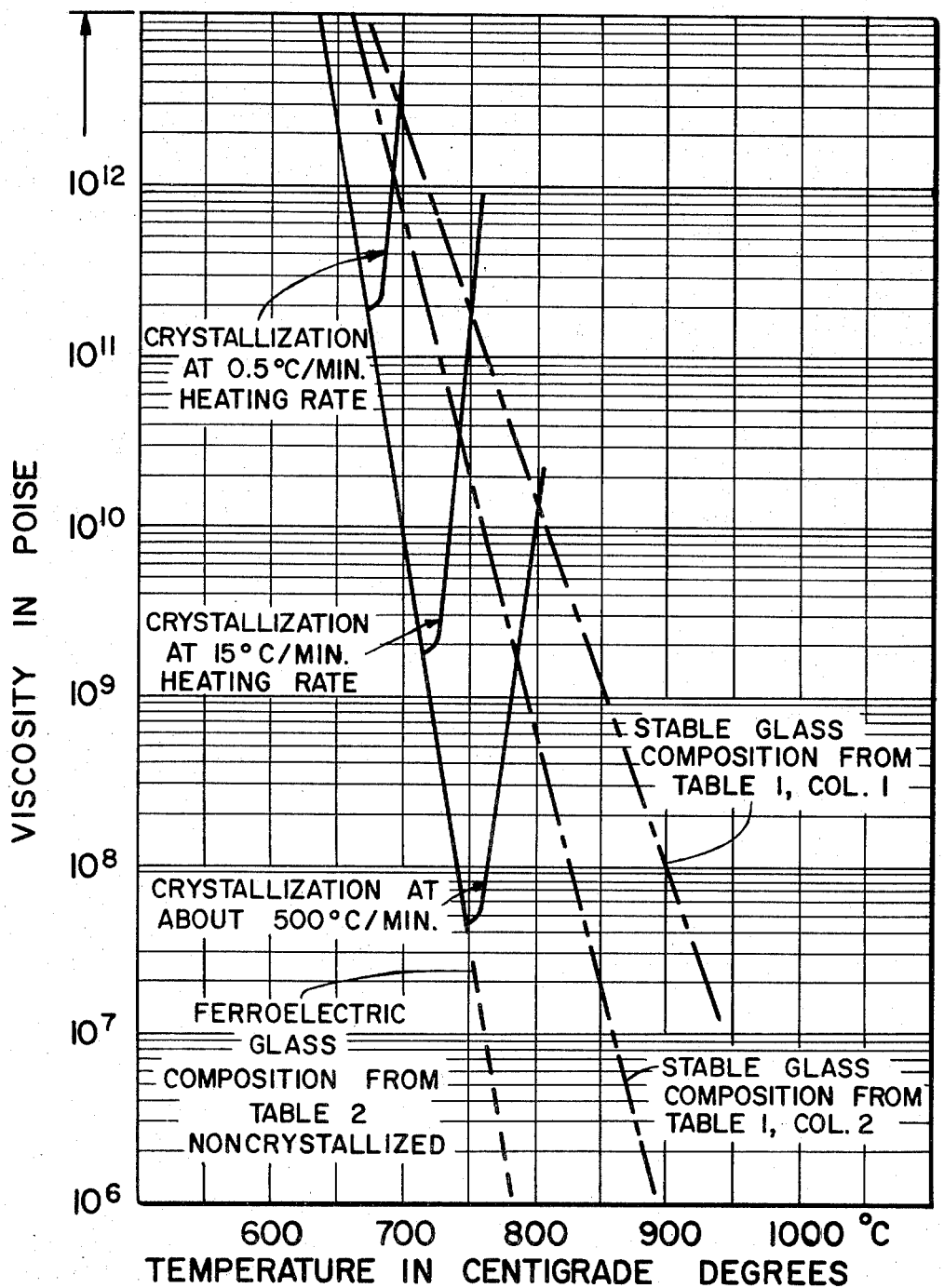
FIG. 3 shows the viscosity vs. temperature relationship of the two glass compositions used in the fabrication of the capacitor described in the example.

It should also be noted that in choosing the compositions of stable and ferroelectric glasses for the fabrication of a frit capacitor dielectric, attention should be paid to the closeness with which their individual viscosity-temperature characteristics match over the temperature range to be employed in the heat treatment. FIG. 3 illustrates this relationship between the ferroelectric glass composition of the instant example and the two stable glass compositions given in Table I. As will be noted in the graph, a mismatch in temperature-viscosity characteristic is tolerable between the stable and ferroelectric glass compositions. However, the viscosity of the stable glass should be above that of the ferroelectric glass at least during the period of time prior to the softening and crystallization of the latter to prevent runoff or segregation of the individual components, during the heat treatment. Once crystallization has commenced segregation of the two glasses is no longer likely to occur as the material becomes increasingly more rigid. The lowest viscosity which occurs in the ferroelectric glass during heat treatment is its viscosity immediately prior to the start of crystallization and this point can be controlled by controlling the rate of heating of the glass. FIG. 3 illustrates the approximate minimum viscosities reached by the ferroelectric glass of the instant example under three different heat treatment heating rates.

Figure 2:
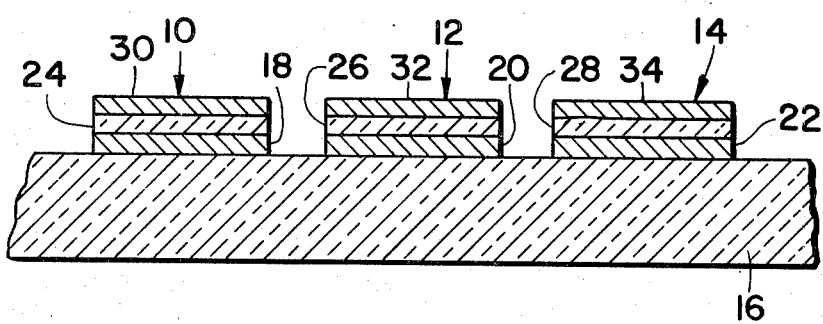
FIG. 2 is a cross-sectional elevation of three microcircuit frit capacitors mounted on a single microcircuit substrate, each capacitor having a dielectric constant individually obtained by the method of the instant invention.

The following example illustrates the manner in which any number of frit capacitors each having a different dielectric constant, and consequently, different values of capacitance per unit area, are obtainable simultaneously with a single firing schedule. Referring to FIG. 2 there are shown three microcircuit frit capacitors 10, 12 and 14 which are formed on the surface of a suitable dielectric substrate 16. The substrate 16 consists of any suitable dielectric material such as alumina, steatite, ceramic material, or the like. Metallized electrode films 18, 20 and 22 serve as first capacitor plates and are applied to the substrate 16 in any suitable manner well known in the art such as silk screening, spraying, sedimentation, or the like. Examples of such films 18, 20 and 22 include silver, gold, platinum, alloys of the foregoing, and the like.

Layers 24, 26 and 28 are glass-ceramic dielectrics of the capacitors 10, 12 and 14 respectively, and are each individually prepared in separate batches so as to provide the desired dielectric constant for each following a single simultaneous firing schedule. In the instant example, a ferroelectric glass having the composition given in Table II and a stable, non-alkali glass having the composition given in column 2 of Table I is provided in powdered form, the grain size of each glass being about 10 microns. The firing schedule to be employed is the same as previously described so as to permit the use of the graph in FIG. 1 for purposes of illustration. In the instant example the capacitor 10 has a dielectric 24 whose dielectric constant is 100, the capacitor 12 has a dielectric 26 whose dielectric constant is 200, and the capacitor 14 has a dielectric 28 whose dielectric constant is 300. Each dielectric, 24, 26 and 28 is to be obtained under the same above-mentioned firing schedule.

In accordance with the previous explanation three batches are prepared having stable to total glass weight ratios of 20, 10 and 4 percent, respectively. These ratios are obtained for each batch from the graph in FIG. 1 based on the individual values of dielectric constants desired. Each of the batches contains a suitable vehicle such as pine oil, oil of lavender, or the like. In the order given above, the first batch is applied to the capacitor plate 18, the second batch to capacitor plate 20 and the third batch to capacitor plate 22, in any suitable manner well known in the art. The unit so formed is heat treated by exposure in an oven to a temperature of 940° C for 5 minutes so as to volatilize the vehicle, promote consolidation of the glass components of each batch, and produce the required amount of ferroelectric crystallization of each batch. Fabrication of the capacitors 10, 12 and 14 is completed in a well known manner by disposing electrode films 30, 32 and 34 over the dielectrics 24, 26 and 28 respectively. The resulting capacitor values are in part dependent upon the dielectric constant of each capacitor 10, 12 and 14, the dielectric constant of each having been obtained individually by controlling the weight ratios of the glass components in each batch, notwithstanding the fact that the same heat treatment schedule is employed for each.

Although the instant invention has been described with respect to specific details of certain embodiments thereof, it is not intended that such details be limitations upon the scope of the instant invention except insofar as set forth in the following claims.

We claim:

1. A method of forming a plurality of frit capacitors on a common substrate, the steps of which comprise
    forming a plurality of first capacitor plates on different portions of said substrate,
    forming a plurality of mixtures of particles of a substantially non-alkaline stable glass and a ferroelectric glass, said non-alkaline stable glass being characterized by a low value of dielectric constant, the percent by weight of said stable and ferroelectric glasses in each of said mixtures of particles being as desired,
    mixing a vehicle with each of said mixtures of particles to form a plurality of fluid batches,
    forming each of said batches into the shape of a capacitor dielectric layer as desired on a different member of said plurality of first capacitor plates,
    heat treating the unit so formed by the foregoing steps so as to volatilize said vehicle, consolidate said particles, and at least partially crystallize said ferroelectric glass whereby a plurality of dielectric materials is provided each of which have a dielectric constant value as desired intermediate that of said stable and heat treated ferroelectric glasses alone, at least one of which has a dielectric constant different from the dielectric constants of the remaining dielectric materials, and
    forming a plurality of second capacitor plates over said capacitor dielectric layers, each of said second capacitor plates being electrically associated with a different member of said plurality of first capacitor plates.

2. The method of claim 1 further comprising the step of mixing said particles in a weight ratio corresponding to the desired value of dielectric constant for each of said materials following a selected schedule of heat treatment.

3. The method of claim 1 wherein the dielectric constant of said stable glass in less than about 20.

* * * * *